May 10, 1927.
J. S. HAGEN
1,628,243
KITCHEN UTENSIL
Filed March 12, 1924
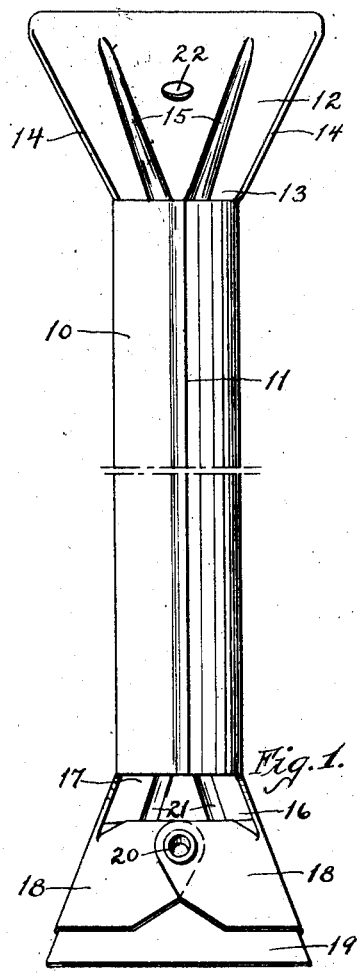
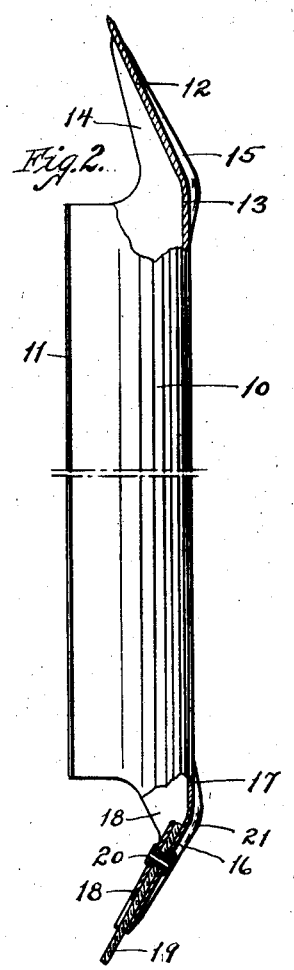
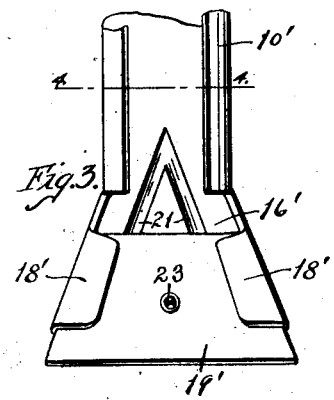
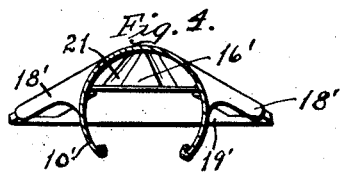
Inventor
J. S. HAGEN
by Earl M. Sinclair, Atty.

Patented May 10, 1927.

UNITED STATES PATENT OFFICE.

JULIUS S. HAGEN, OF DES MOINES, IOWA.

KITCHEN UTENSIL.

Application filed March 12, 1924. Serial No. 698,688.

The object of this invention is to provide an improved article of manufacture which is especially adapted for use in scraping and cleaning particles or remnants of food from dishes, pans and so forth.

A further object of this invention is to provide an improved kitchen utensil which is very convenient, simple in construction, of light weight, and sanitary, especially adapted for scraping and cleaning dishes and other utensils.

My invention consists in the construction, arrangement and combination of elements hereinafter set forth, pointed out in the claims and illustrated by the accompanying drawing, in which—

Figure 1 is an elevation illustrating my improved tool. Figure 2 is a view at right angles to Figure 1, partly in section.

Figure 3 is a view similar to Figure 1, showing a portion of a tool of modified construction. Figure 4 is a cross-section on the line 4—4 of Figure 3.

In the construction of the device as shown particularly in Figures 1 and 2 the numeral 10 designates generally a handle element which is of hollow or tubular form, preferably circular in cross-section, and formed from a sheet of metal by stamping, pressing, rolling or drawing, or in any other suitable manner. As here shown the handle 10 is in the form of a complete circle in cross-section, the longer margins of the sheet from which it is formed meeting at the line 11 to form a butt or lap joint, or being interfolded to form a seam if desired. The handle 10 may be of any desired length, and at one end is formed with an integral scraper 12, having a relatively narrow neck 13 which is not wider than the diameter of the handle, and widening out toward its free margin, which is plane and straight and at right angles to the axis of the handle. The major portion of the scraper 12 is plane, and is inclined forwardly across the axis of the handle as clearly shown in Figure 2, and said scraper preferably is formed with inturned marginal flanges 14 on its side margins, which flanges may taper out near the free margin of the scraper and merge at their inner ends into the handle member on curved or inclined lines. The scraper 12 also may be formed with reenforcing ribs 15 longitudinally arranged and extending across the narrow neck 13 into the adjacent end of the handle, to lend stiffness and strength to the device in use.

At its opposite end the handle 10 is formed with a blade portion 16 similar in shape and arrangement to the scraper 12, having a narrow neck 17 connecting it integrally with the handle and widening out toward its free margin, the blade 16 being plane in its major portion and being inclined inwardly to or across the axis of the handle. The blade 16 is formed with integral marginal flanges 18 on its side margins which are bent or folded inwardly into planes substantially parallel with the body thereof and enclose and engage a tapered scraping element 19 of soft rubber or other semi-flexible material, which has its wider or free margin projecting beyond the wider or free margin of the blade and beyond said flanges. The flanges 18 may overlap and be conjunctively secured to the blade at a central point by a rivet or eyelet 20, which preferably also passes through the scraping element 19 and serves to retain it in place. The blade 16 also is formed with the reinforcing ribs 21 stamped therein and extending across the neck 17 into the handle 10.

In practical use the tool is employed for scraping particles or remnants of food from plates, glassware, tinware, kettles or the like, the handle being grasped by the user with either end projecting beyond the finger tips and employed for scraping and dislodging the food. If pressure is required it may be applied by extending one or more of the fingers along the end portion of the handle and upon the neck 13 or 17 or the back of the scraper 12 or blade 16. The metallic scraper is designed especially for scraping tin or metal ware such as pans or kettles, while the rubber scraping element 19 is thought to be best adapted for used on china or glass ware, but the user may be guided by his own desires or judgment as to the preferred manner of use in particular instances. The cleansing operation may be aided by flushing with water if desired simultaneously with the scraping operation.

The tool may be suspended from a nail or hook which may extend through the eyelet 20 or through a hole 22 formed in the scraper 12.

In the form shown in Figures 3 and 4 the handle 10' is formed on the major arc of a circle, in cross-section, but the margins of the metal are spaced apart a suitable distance so that the handle is of channel form, which aids in keeping the device clean and sanitary by facilitating the removal of particles from the hollow handle. In this form also the rubber scraping element 19' is retained by side flanges 18' of the blade 16' and the rivet or eyelet is omitted. The flanges 18' are narrow and are crimped upon and grip frictionally the side marginal portions of the scraping element 19'. If desired a rivet or eyelet 23 may be inserted through the blade 16' and scraping element 19', near the center of the free margin of the former, to hold the flexible scraping element snugly thereto and prevent the accumulation of particles between said members.

Also if desired the free margins of the channeled handle 10' may be turned in or rolled longitudinally as indicated in Figure 4, to strengthen them and also provide more finished edges. This channeled form of the handle is especially advantageous because of its more sanitary characteristics.

The handle 10 or 10' may be provided with scraping devices at one end only if desired, separate tools being provided with the metallic and flexible scrapers.

I claim as my invention—

1. A kitchen utensil, comprising a tubular handle substantially circular in cross-section, a blade formed integrally on one end of said handle, said blade being formed with flanges on its side margins, and a flexible scraping element mounted against said blade and extending beyond the free margin thereof, said flanges being bent around the lateral margins of said scraping element into a plane substantially parallel with said blade, said scraping element being engaged and held by the side flanges of said blade.

2. A kitchen utensil, comprising a substantially tubular handle, a blade formed integrally on one end of said handle and formed with inturned side flanges, together with a rubber scraping element mounted against one face of said blade and extending beyond the free margin thereof, said flanges extending to the outermost margin of said blade and being bent around the lateral margins of said scraping element into a plane substantially parallel with the blade, and fastening means extending through the central portions of said blade and scraping element.

Signed at Des Moines, in the county of Polk and State of Iowa, this 6th day of November, 1923.

JULIUS S. HAGEN.